United States Patent [19]
Rix et al.

[11] 3,911,757
[45] Oct. 14, 1975

[54] FINE-TOOTHED GEAR PAIR

[75] Inventors: Albert Rix; Hans Fuchs; Rolf Moritz; Jens Onuscheit, all of Wilhelmshaven, Germany

[73] Assignee: Olympia Werke AG, Wilhelmshaven, Germany

[22] Filed: Oct. 11, 1974

[21] Appl. No.: 514,280

[30] Foreign Application Priority Data
Oct. 15, 1973   Germany............................ 2351603

[52] U.S. Cl. ...................... 74/437; 74/393; 74/405
[51] Int. Cl.² ........................................ F16H 55/04
[58] Field of Search....................... 74/393, 437, 405

[56] References Cited
UNITED STATES PATENTS
| | | | |
|---|---|---|---|
| 2,842,977 | 7/1958 | Stibitz................................... | 74/437 |
| 2,866,353 | 12/1958 | Ewing................................... | 74/437 |
| 3,365,965 | 1/1968 | French.............................. | 74/437 X |

Primary Examiner—John J. Camby
Attorney, Agent, or Firm—Spencer & Kaye

[57] ABSTRACT

A fine-toothed gear pair is formed of a continuously rotated driving member having elastic gear teeth about its circumference, and a driven member having a series of elastic gear teeth along a portion of its circumference. The driving and driven members are arranged for short-period, intermittent meshing engagement during which the driven teeth engage consecutively the driving teeth. At least the first three teeth of the driven tooth series constitute run-in teeth, each having an undercut surface portion. The distance between the run-in teeth is smaller than that between the other driven teeth. The height of at least the first three run-in teeth progressively decreases from the first to the third run-in tooth.

3 Claims, 4 Drawing Figures

FINE-TOOTHED GEAR PAIR

BACKGROUND OF THE INVENTION

The invention relates to an intermittently driven fine-toothed gear pair which has tooth divisions in the order of approximately 1 mm. The gear pair is formed of a continuously rotated driving member having elastic teeth about its circumference and a driven member having a series of elastic teeth along a portion of its circumference. The spacing between the teeth of the driving member is larger than the spacing between the teeth of the driven member. The elasticity of the material of the teeth on the driving member is greater than the elasticity of the material of the teeth on the driven member. The driving and driven members are arranged for short-period intermittent meshing engagement during the course of which the teeth of the tooth series on the driven member engage consecutively the teeth on the driving member.

Synthetic materials of different types have long been used for the manufacture of toothed gears. Thus, for example, polyamides or elastic polyurathanes, or woven fabrics impregnated with phenyl resin, have been used for making toothed gears because, due to their elastic properties, operational noises are substantially suppressed and further, a protection of the entire structure is ensured.

Tests relating to the load resistance of thermoplastic toothed gears are set forth, for example, in the periodical KONSTRUKTION, 20th Year (1968), Issue 10, pages 385–390.* These tests showed that deformations are of particular significance in toothed gears made of synthetic material. They increase the degreee of overlap, so that the load on the individual tooth is effectively decreased. Nevertheless, in case high torques are transmitted with fine-toothed gear pairs made of synthetic material and having a conventional tooth structure such as involute teeth or Novikov teeth, tooth breakages have occurred.

*Springer Verlag Berlin Dr. G. Klein, "Untersuchungen zur Tragfähigkeit thermoplastischer Kunststoffzahnräder"

It has been proposed to provide a fine-toothed gear pair with a tooth structure that can be submitted to high loads. The profile of these teeth is so designed that upon tracing the geometrical connecting line between the center points of curvature of the two toothed members, there takes place a full-surface touching of the force-transmitting tooth flanks; further, the direction of load of the force-transmitting teeth of the tooth pair is perpendicular to the foot flank of the fully elastic toothed member and the head flanks of the teeth of the less elastic toothed member are inclined approximately 5° steeper, with regard to the foot flanks of the teeth of the fully elastic toothed member. The gear pair of this structure was proved to be advantageous, because the bending stresses at the teeth were largely eliminated. Furthermore, a gear pair of the above-outlined structure is advantageous in that it has a high load bearing capacity and a long life expectancy. In a fine-toothed gear pair of this type, however, disturbances may appear during the gear coupling step, particularly if the tooth tips encounter one another. As a result, blockage may occur which, in turn, may cause tooth breakage. The above-outlined proposed arrangement does not always make possible a uniform force thrust during coupling which leads, for example in case of a drive for type bars in typewriting machines, to energy fluctuations and thus to non-uniform imprints.

SUMMARY OF THE INVENTION

It is an object of the invention to provide an improved intermittently operating, fine-toothed gear pair which ensures a steady force thrust during the coupling step and wherein the full torque is transmitted at the earliest possible moment during the coupling step.

These objects and others to become apparent as the specification progresses, are accomplished by the invention according to which, briefly stated, at least the first three teeth on the driven member constitute run-in teeth, each having an undercut surface portion with respect to the other teeth of said series; the distance between the run-in teeth is smaller than the distance between the other teeth of said series; and the height of at least the first three run-in teeth progressively decreases from the first to the third run-in tooth.

By virtue of the three run-in teeth, a tip-to-tip encounter of the teeth of the gear pairs during the coupling step is securely prevented. Further, the three run-in teeth transmit a torque in such a manner that the play in the drive components is already used up when the fourth tooth of the driven member arrives into engagement with the teeth of the driving member (for example, a rotating drive shaft). In this manner an early transmission of the full torque is achieved.

BRIEF DESCRIPTION OF THE DRAWINGS

FIG. 4 is a view similar to FIG. 3, depicting the gear pair when the first run-in tooth of one gear fully engages the teeth of the other gear.

DESCRIPTION OF THE PREFERRED EMBODIMENT

Figure 1:
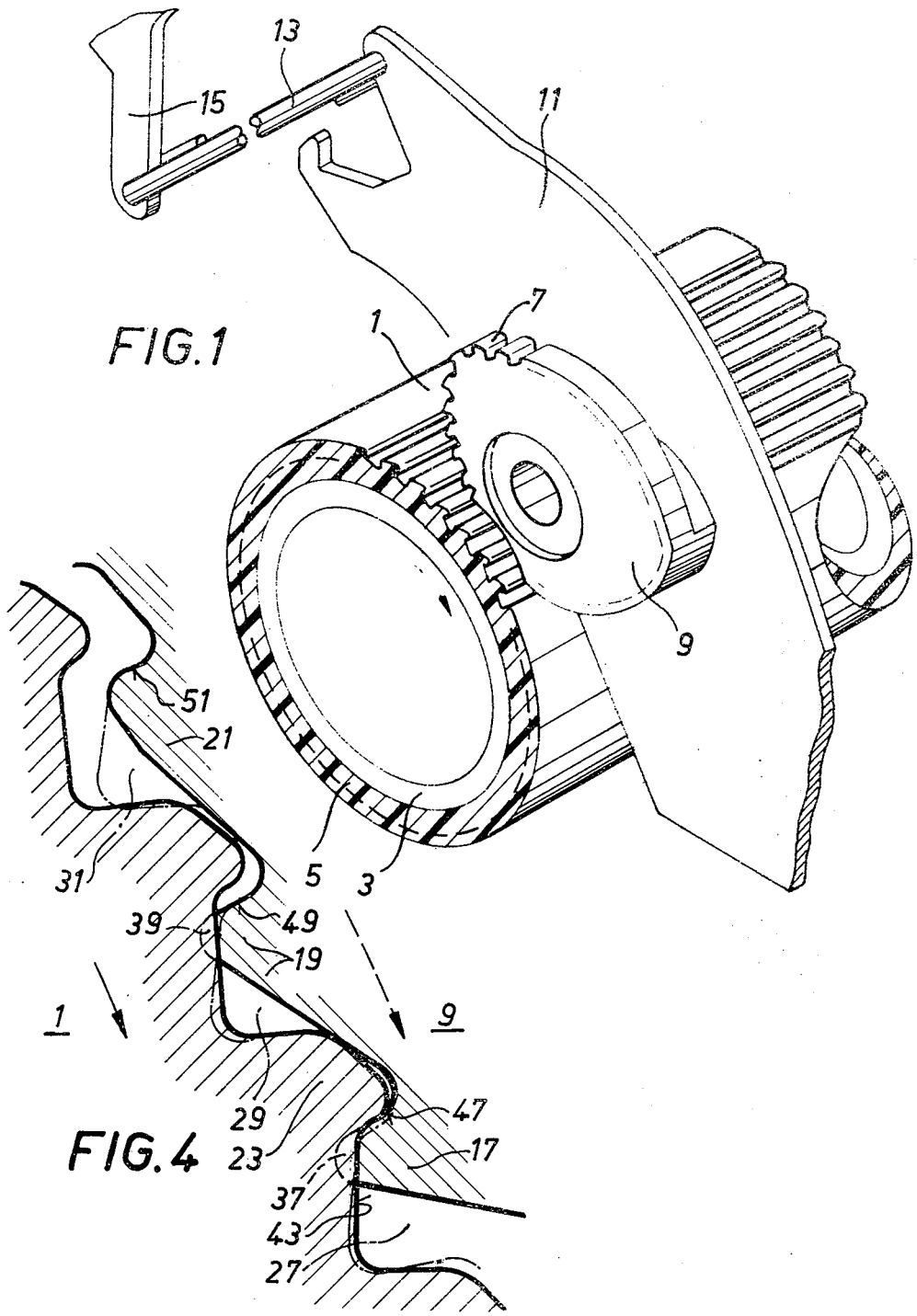
FIG. 1 is a perspective view of a preferred embodiment of the invention.

Turning now to FIG. 1, there is shown a drive mechanism for type bar drives in typewriters. The continuously and unidirectionally rotating carrier shaft 3 has a sprayed-on tooth structure made of a fully elastic synthetic material to constitute a driving member, such as a drive shaft 1. The synthetic material may be, for example a polyamide belonging to the group of thermoplastic synthetic materials. The fine-toothed structure 5 of the drive shaft 1 cooperates with a fine-toothed structure 7 of a driven member, such as a cam 9. The tooth structure 7 is made of a less elastic material, such as an acetal resin. The cam 9 is rotatably held on an intermediate lever 11 and may be coupled for a brief period to the drive shaft 1 by control components, not shown. By virtue of a form-locking engagement, the cam 9, rotated by the shaft 1, pivots the intermediate lever 11 which exerts a force on a type bar 15 in a known manner by means of a taut wire 13. The fine-toothed structures 5 and 7 have a tooth division of approximately 1 mm; the tooth division of the tooth structure 7 of the cam 9 is smaller than that of the tooth structure 5 of the drive shaft 1. Such an arrangement is required due to the deformation of the elastic tooth structures during force transmission.

Figures 2, 3:
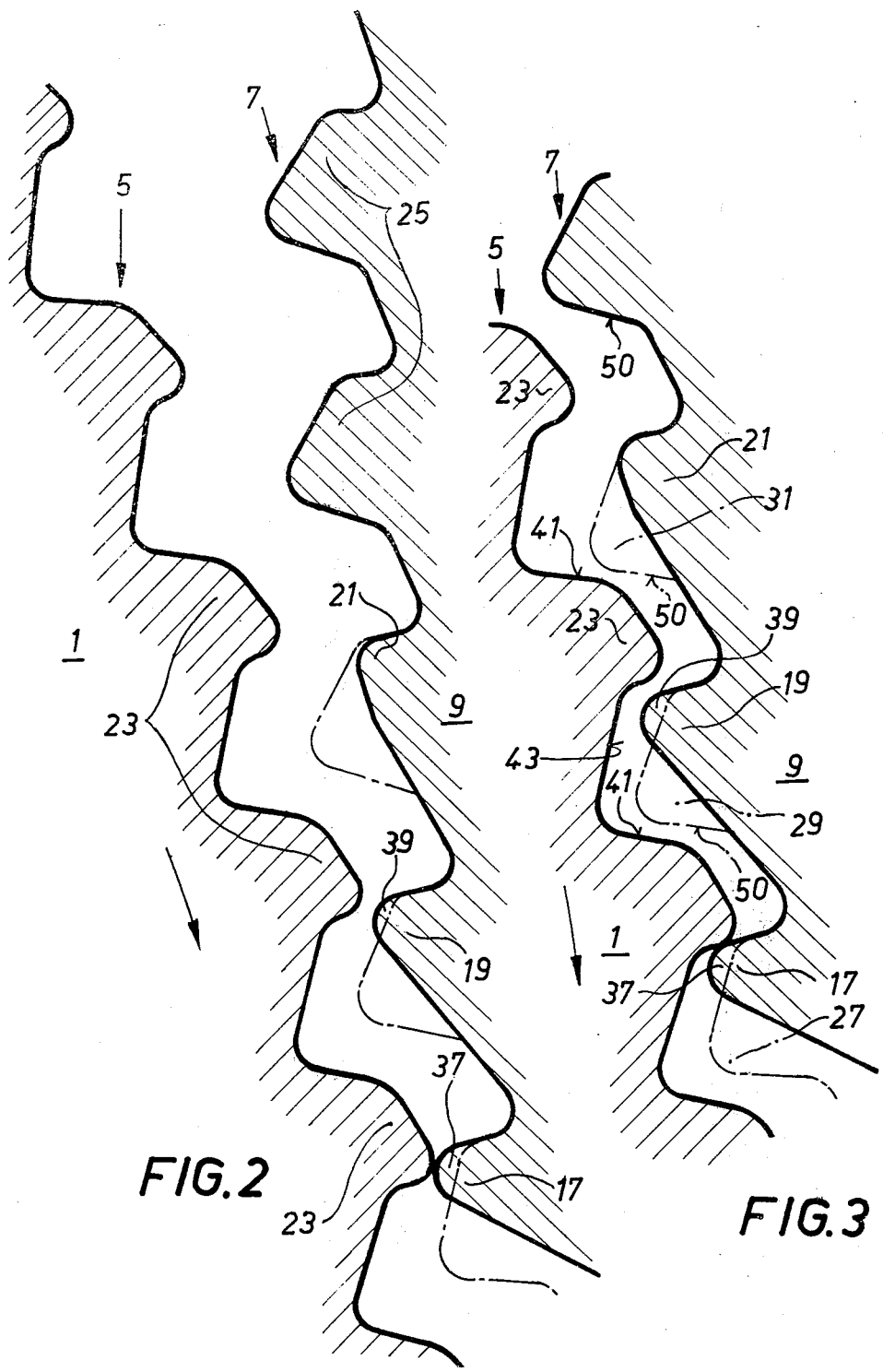
FIG. 2 is a fragmentary cross-sectional view, on an enlarged scale, of the tooth structure of a gear pair according to the same embodiment.
FIG. 3 is a view similar to FIG. 2 illustrating a further feature of the invention.

In FIGS. 2–4 there are shown, on an enlarged scale and in a non-stressed condition, the teeth 23 of the tooth structure 5 of the drive shaft 1, the cam teeth 25 which transmit the full torque, and the run-in cam teeth 17, 19 and 21. The head corrections of the three run-in teeth 17, 19 and 21 with respect to the other, uniformly built teeth 25 are clearly seen. For a better comparison between the profile of the run-in teeth and the normal teeth, the outline of the teeth 25 are shown superimposed on the run-in teeth 17, 19 and 21. For purposes to be discussed later, the three run-in teeth 17, 19 and 21 have, on the one hand, undercut surface portions 27, 29 and 31, respectively, and, on the other hand, the first two run-in teeth 17, 19 are additionally provided with rearwardly oriented projections 37 and 39, respectively. The projections 37 and 39 adjoin, in the rearward direction, the undercut surface portions 27 and 29, respectively. Each run-in tooth 17, 19, 21 has a rounded-off head portion. The height of the three run-in teeth 17, 19, 21 decreases from the first run-in tooth 17 to the third run-in tooth 21.

In FIG. 2 the reduction of the tooth division between the first three run-in teeth 17, 19 and 21 with respect to the tooth divisions of the successive teeth 25 of the cam 9 and with respect to the tooth divisions of the teeth 23 of the drive shaft 1 may be clearly observed. By virtue of offsetting the teeth in this manner, a tip-to-tip encounter between the second run-in tooth 19 and a tooth 23 is prevented, should such an encounter take place between the first run-in tooth 17 and a tooth 23. Thus, the gear coupling process is not disturbed.

At the beginning of the gear coupling step, by virtue of the first load thrust, the suddenly stressed teeth 23 undergo a deformation. In the absence of undercut surface portions 27, 29, 31 this deformation causes the head flanks 50 of the teeth 25 of the cam 9 to engage the flanks 41 of the teeth 23 of the drive shaft 1 prematurely and the teeth 23 are thus submitted to bending from behind. As the teeth of the cam 9 leave the teeth 23 of the drive shaft 1, tooth breakage may thus occur. This premature engagement is prevented by the provision of the three surfaces 27, 29 and 31.

In order to eliminate the play in the gear components at the earliest possible moment, the first two run-in teeth 17 and 19 are provided with the projections 37 and 39, respectively. If an elevation 37 according to FIG. 3 were not present, the first tooth 17 could not yet transmit a force. On the other hand, the elevated portions 37 and 39 at the run-in teeth 17 and 19 provide that the teeth 23 are not submitted to bending as early as the beginning of the gear coupling step. The direction of load on the force-transmitting teeth is oriented perpendicularly to the foot flank 43 of the fully elastic tooth 23 (FIG. 3). The geometrical extension of the radial flanks 47, 49 and 51 of the run-in teeth 17, 19 and 21 pass through the center (not illustrated) of curvatures of cam 9.

The divisional offset and the head correction of the three run-in teeth 17, 19, 21 make possible a uniform force thrust at all times during the coupling process. The run-in teeth 17, 19 and 21 do not deform during the first force thrust, but they provide that the play in the drive components is used up before the non-corrected fourth tooth 25 of the cam 9 meshes with the teeth 23 of the shaft 1. In this manner an early transmission of the full torque is achieved. Thus, during the gear coupling process there appear no blockages or similar disturbances which would adversely affect the life expectancy of the tooth structures.

Subsequent to the run-in step of the three run-in teeth 17, 19 and 21, those teeth take over the transmission of the full torque which may be exposed to the maximum load.

It will be understood that the above description of the present invention is suceptible to various modification, changes and adaptations, and the same are intended to be comprehended within the meaning and range of equivalents of the appended claims.

We claim:

1. In a fine-toothed gear pair formed of a continuously rotated driving member having elastic teeth about its circumference and a driven member having a series of elastic teeth along a portion of its circumference, the spacing between the teeth of the driving member being larger than the spacing between the teeth of the driven member, the elasticity of the material of the teeth on the driving member being greater than the elasticity of the material of the teeth on the driven member; the driving and driven members being arranged for short-period intermittent meshing engagement during the course of which the teeth of the tooth series on the driven member engage consecutively the teeth on the driving member, the improvement wherein at least the first three teeth on said driven member constitute run-in teeth each having an undercut surface portion with respect to the other teeth of said series; the distance between said run-in teeth being smaller than the distance between the other teeth of said series; and the height of said at least first three run-in teeth progressively decreases from the first to the third run-in tooth.

2. A gear pair as defined in claim 1, wherein at least the first three run-in teeth are provided with a rounded-off head portion.

3. A gear pair as defined in claim 1, wherein the first two run-in teeth each have a rearwardly oriented, rounded projection beyond said undercut surface.

* * * * *